July 16, 1968　　　　　E. I. PLOUS　　　　3,392,515
ROTARY LAWNMOWER BLADE
Filed Sept. 29, 1965
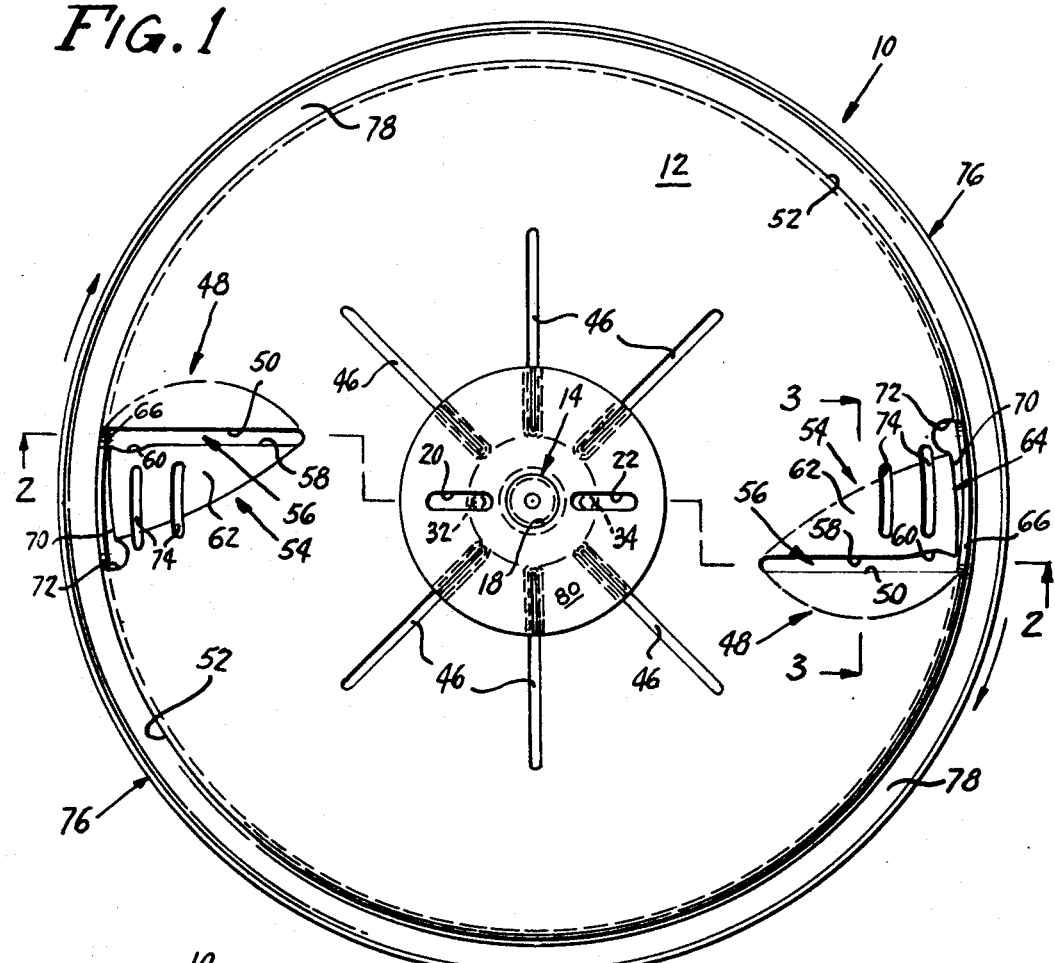
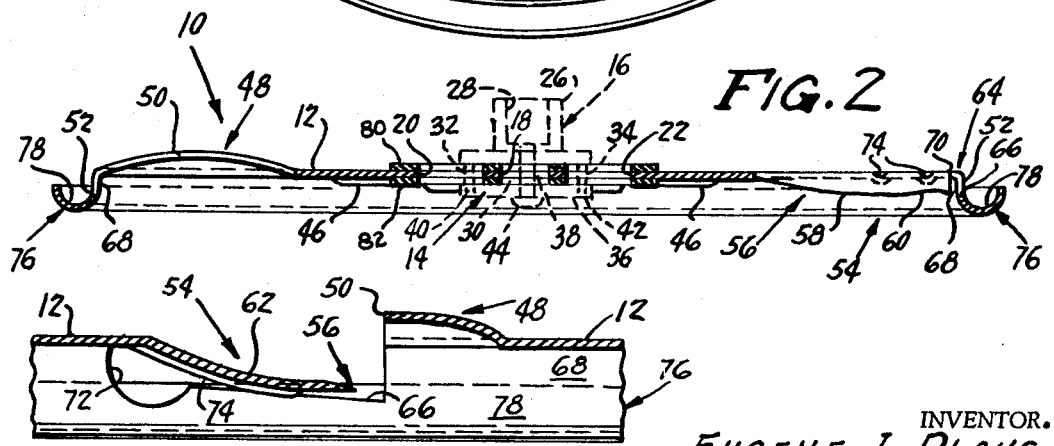
INVENTOR.
EUGENE I. PLOUS
BY *Kimmel, Crowell & Weaver*
ATTORNEYS.

United States Patent Office 3,392,515
Patented July 16, 1968

3,392,515
ROTARY LAWNMOWER BLADE
Eugene I. Plous, 569 Fisher Bldg.,
Detroit, Mich. 48226
Filed Sept. 29, 1965, Ser. No. 491,167
13 Claims. (Cl. 56—295)

This invention relates to a blade for a rotary lawnmower and particularly to a blade of this type including a circular planar disc forming a plurality of cutting slots therein and which also forms a grass removal slot extending away from the cutting slot.

Rotary lawnmower blades providing a flat disc forming cutting slots are known to the prior art with U.S. Patent 3,097,469 being illustrative with the instant invention constituting an improvement thereover. It has been found that grass cut by such a mower tends to move outwardly along the cutting edge due to centrifugal force with the outer end of the cutting edge becoming clogged with cut grass. Another disadvantage residing in the lawn mower blade of the aforementioned patent is that the device must be balanced before being coupled to a lawnmower to avoid undue vibration thereof.

Accordingly, it is a primary object of the instant invention to provide a flat disc-type lawnmower blade equipped with means on the outer end of a cutting slot precluding the build-up or clogging of cut grass.

Another object of the instant invention is to provide a flat disc-type blade for rotary lawnmowers having a depending circumferential rim which does not have to be balanced prior to assembly on a rotary lawnmower.

A more specific object of the instant invention is to provide a flat disc-type lawnmower blade having a plurality of cutting slots extending generally along a chord of the disc with a rearwardly extending grass removal slot communicating therewith.

Another more specific object of the instant invention is to provide a flat disc-type blade for a rotary lawnmower having a depending substantially semi-circular rim thereon which does not have to be balanced prior to assembly to a rotatable shaft of a conventional rotary lawnmower.

A further object of the instant invention is to provide a flat disc-type blade of the character described which is sturdy and durable in construction, reliable and efficient in operation, and simple and inexpensive to manufacture, install and utilize.

Other objects and advantages of the instant invention reside in the combinations of elements, arrangements of parts, and features of construction and operation, all as will be more fully pointed out hereinafter and disclosed in the accompanying drawing wherein there is shown a preferred embodiment of this inventive concept.

In the drawing:

FIGURE 1 is a top plan view of the instant invention showing in dashed lines an adapter for connection with a rotatable shaft of a conventional rotary lawnmower;

FIGURE 2 is an enlarged cross-sectional view of the blade of FIGURE 1 taken substantially along line 2—2 thereof, viewing in the direction of the arrows; and FIGURE 3 is an enlarged cross-sectional view of the lawnmower blade of FIGURES 1 and 2 taken substantially along line 3—3 of FIGURE 1 viewing in the direction of the arrows.

Referring now to the drawing in detail, wherein like reference characters designate like elements throughout the several views thereof, there is indicated generally at 10 a blade for a rotary lawnmower including a circular, substantially planar, sheet or disc 12 having a centrally disposed connecting means shown generally at 14 to which may be secured an adapter indicated generally at 16 for securement to a rotatable blade of a conventional rotary-type lawnmower. Connecting means 14 including a central aperture 18 and a pair of elongated slots 20, 22 extending along a diameter of disc 12 as may best be seen in FIGURE 1.

Adapter 16 includes a circular plate 24 fixedly carrying a socket 26 having a splined blind aperture 28 for non-rotatably receiving a splined rotatable shaft of a conventional mower. Depending from the center of circular plate 28 is a boss 30 closely received in central aperture 18 with a pair of depending lugs 32, 34 being closely received in elongated slots 20, 22.

Positioned beneath plate 12 is a stop member 36 forming a central notch 38 receiving boss 30 and a pair of blind slots 40, 42 receiving lugs 32, 34. A frictional fastening device 44, such as a metal screw or the like, fixedly secures stop member 36 to plate 24 with disc 12 sandwiched therebetween. As will be apparent to those skilled in the art, a rotatable shaft of a conventional power mower will be secured in blind opening 28 by the aforementioned spline and set screw making a secure connection.

It should also be noted that adapter 16 precludes any relative rotational movement between a rotatable shaft and disc 12 because of the interaction of lugs 32, 34 and slots 20, 22.

Disc 12 includes a plurality of radially extending ribs 46 which are preferably stamped into disc 12 projecting therebelow as may be seen in FIGURE 2. Plate 12 also forms a plurality of suction cups shown generally at 48 which, as may be seen in FIGURES 2 and 3, form an arcuately concave body with respect to disc 12 providing a terminal edge 50 extending substantially along a chord line of disc 12 adjacent circumference 52 thereof.

Disc 12 also forms a plurality of cutting cups shown generally at 54 providing a terminal edge forming a sharpened cutting blade shown generally at 56. Cutting blades 56 include a straight segment 58 lying substantially along a chord line of disc 12 and an arcuate segment 60 communicating therewith and positioned closely adjacent circumference 52 of disc 12. As may be seen in FIGURES 1 and 3, the terminal edges of cups 48, 54 form a first slot extending substantially along a chord line of disc 12. It has been found that the arcuate segment 60 of cutting edge 56 tends to act as a scythe and provides a more efficient cutting blade, particularly adjacent the area which tends to become clogged with cut grass, as mentioned previously. When grass is cut by cutting blade segments 54, 60, the grass tends to move outwardly along an upper surface 62 of cutting cup 54 and clogging of the cutting blade ensues, particularly adjacent the intersection of the cutting slot and circumference 52 of disc 12.

Communicating with the outer ends of the cutting slots formed by cups 48, 50 is a grass removal slot 64 extending substantially parallel to circumference 52 of disc 12. One edge 66 of slot 64 is formed by a notch in a depending annular flange 68 affixed about the circumference of disc 12. The other edge 70 of slot 64 is formed by cutting away a portion of upper surface 62 of cup 54 such that slot 64 is substantially parallel to circumference 52 of disc 12. Slot 64 is formed with a bulbous blind end 72 rearwardly of cup 54 by enlarging the cutaways of disc 12 and annular flange 68, as may be seen in FIGURES 1 and 3.

It has been found that the angularity of edge 66 affects the grass removing ability of slot 64 and bulbous end 72. Experimentation indicates that an inclined orientation of edge 66, as may be seen in FIGURE 3, downwardly angled less than about 30° with respect to the direction of rotation of disc 12, has proved most efficacious in the grass removing operation. It has further been found that slot 64 substantially weakens cutting cup 54 by removing a lateral support. Accordingly, a plurality of ribs 74 have been stamped into cup 54 substantially parallel to circumference 52 for structural strength purposes.

In order to obviate an individual's inadvertently placing a foot beneath disc 12, a rim 76 is provided about the circumference of sheet 12 and includes a member 78 which is generally semi-circular in cross-sectional configuration having one leg thereof secured to depending annular flange 68, as may be seen in FIGURE 2. It will be noted from FIGURE 3, in particular, that cutting blades 56, annular flange 68 and circumferential rim 76 are all located on one side of disc 12 with semi-circular member 78 constituting about one-half of the distance between the top of disc 12 and the bottom of circular rim 76 with cutting blades 56 lying substantially along the bisector thereof.

In operation of the instant invention, blade 10 will be secured to a rotatable shaft of a conventional rotary lawnmower utilizing adapter 16 as previously mentioned. The prime mover of the lawnmower will be activated to induce rotation of blade 10 in the direction shown by the arrows in FIGURE 1 with the assembled device propelled across the area desired to be mowed. As cutting blades 56 approach a particular stand of grass, suction cup 48 will induce a slight subatmospheric pressure causing the grass blades to stand substantially vertical.

As the grass blades are substantially vertical, cutting blades 56 will sever the uppermost portion thereof with some of the cut grass flying rearwardly of cutting cup 54. Some of the grass cut will come to rest on upper surface 62 of cutting cup 54 while another portion of cut grass will tend to cling to cutting blade 56. Cut grasses accumulating on cutting blade 56 and upper surface 62 of cutting cups 54 will tend to move outwardly due to the influence of centrifugal force. As this cut grass approaches slot 64, it will be moved into the cup formed by semicircular member 78 of circumferential rim 76 from which it is normally swept away by wind movement.

As an additional feature, it has been found desirable to provide a pair of strengthening circular plates 80, 82 sandwiched between adapter 16 and disc 12. Plates 80, 82 are provided with suitable grooves complementarily fitting into and receiving stamped ridges 46 and apertures communicating with slots 20, 22 receiving lugs 32, 34.

It is now seen that there is herein provided an improved blade for rotary lawnmowers having all of the objects of this invention and others, including many advantages of great practical utility and commercial importance.

Since many embodiments may be made of the instant inventive concept, and since many modifications may be made in the embodiment hereinbefore shown and described, it is to be understood that the foregoing is to be interpreted merely as illustrative and not in a limiting sense.

What is claimed is:

1. A blade comprising a circular substantially planar sheet of material forming a central aperture adapted to be connected to a rotatable shaft of a rotary type lawnmower and a circumference, said sheet forming a suction cup on one side of said sheet arcuately concave with respect to said sheet providing a terminal edge and a cutting cup on the other side of said sheet adjacent said first cup, arcuately concave with respect to said sheet providing a terminal edge forming a cutting blade, said terminal edges forming a first slot in said sheet, said cutting blade including a straight segment lying upon a chord of said sheet and an arcuate segment between said straight segment and said circumference communicating with said straight segment, said arcuate segment being concave with respect to an imaginary linear extension of said straight segment, said sheet forming a second slot through said second cup communicating with said first slot and extending at an angle away from said first slot.

2. The structure of claim 1 wherein said second slot is positioned between said arcuate segment and said circumference.

3. The structure of claim 2 wherein said second slot is parallel to said circumference.

4. The structure of claim 3 wherein said second slot slot is formed with a bulbous blind end.

5. The structure of claim 1 wherein said sheet forms a circumferential rim extending away from said sheet to a point beyond said cutting edge.

6. The structure of claim 5 wherein said rim includes an annular flange secured about the periphery of said sheet carrying one leg of a semicircular cross-sectioned bead.

7. The structure of claim 6 wherein said second slot is formed by cutting away a portion of said flange and a portion of said cutting cup adjacent the periphery of sad sheet.

8. The structure of claim 7 wherein said cutting cup includes at least one strengthening rib.

9. The structure of claim 8 wherein said rib is parallel to said circumference.

10. A blade comprising a circular substantially planar disc of material forming a central aperture, a circumference, a plurality of suction cups on one side of said disc and a plurality of cutting cups on the other side of said disc juxtaposed to said suction cups forming a plurality of slots extending generally away from said central aperture toward said circumference, each of said cutting cups forming a cutting edge on said one side of said disc, a rim secured about the circumference of said disc including a bead generally semicircular in cross section extending away from said one side of said disc at least as far as said cutting edges.

11. The structure of claim 10 wherein said cutting edges include a straight segment, an arcuate segment communicating with said straight segment concave with respect to a linear extension of said straight segment.

12. The structure of claim 11 including a circumferential rim extending away from said sheet to a point beyond said cutting edge, said blade forms a grass removal slot communicating with each of said slots extending away from said center, said grass removal slot including a first edge formed by said circumferential rim and a second edge formed by said disc.

13. The structure of claim 12 wherein said second edge is inclined downwardly not greater than about 30° with respect to said disc.

References Cited

UNITED STATES PATENTS

| | | | |
|---|---|---|---|
| 3,078,573 | 2/1963 | Kern | 56—295 |
| 3,097,469 | 7/1963 | Belfiore | 56—295 |
| 3,338,039 | 8/1967 | Nightingale et al. | 56—295 |

ANTONIO F. GUIDA, *Primary Examiner.*